(No Model.)

A. W. STEVENS.
VEHICLE WHEEL HUB.

No. 270,257. Patented Jan. 9, 1883.

Witnesses:
W. B. Masson
C. C. Shepherd

Inventor:
Abram W. Stevens
by E. E. Masson
atty.

UNITED STATES PATENT OFFICE.

ABRAM W. STEVENS, OF AUBURN, NEW YORK.

VEHICLE-WHEEL HUB.

SPECIFICATION forming part of Letters Patent No. 270,257, dated January 9, 1883.

Application filed February 8, 1882. (No model.)

*To all whom it may concern:*

Be it known that I, ABRAM W. STEVENS, a citizen of the United States, residing at Auburn, in the county of Cayuga and State of New York, have invented certain new and useful Improvements in Vehicle-Wheel Hubs, of which the following is a specification.

My invention relates mainly to metallic hubs of vehicle-wheels; and the objects of my improvements are, first, to concentrate the largest amount of the metal of which said hubs are composed into two rings projecting therefrom, each ring receiving a series of spokes having one end screwed therein; and, second, to connect the hub with the axle by means of a metallic washer, made of two segmental pieces hinged together in such manner that the hinge thereof projects inwardly into a longitudinal groove formed into the axle within a circular groove made to receive the washer and retain it upon the axle.

Heretofore vehicle-wheels having hubs made of a series of metallic parts, as well as solid metal and wooden hubs, have been provided with spokes screwed into their peripheries. Axle-washers have also been made of two segmental pieces of metal hinged together, and adapted to enter a circular groove in the axle to retain the latter connected with the hub. They have been made to rotate with the axle, and secured thereto by means of a pin passing entirely through the axle and washer, or by means of a short pin or a lug projecting from the inner surface of one of the segments of the ring-washer and entering a small hole made into the axle; and although these devices will retain the washer well connected to the axle they differ from mine in the form of the hinge, and in other details of construction hereinafter described, and specifically pointed out in the claim, as well as shown in the accompanying drawings, in which—

Figure 1:
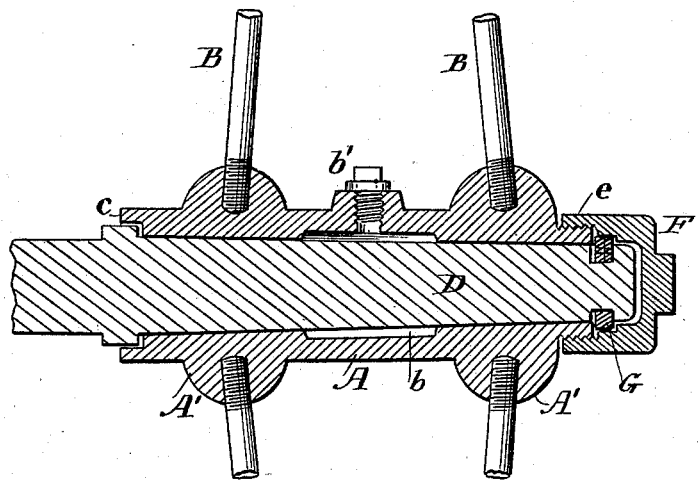
Figure 2:
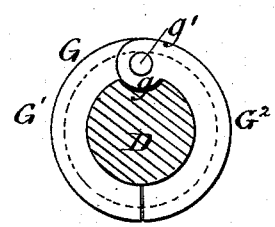
Figure 3:
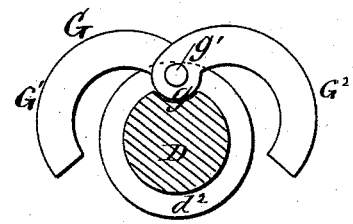
Figure 4:
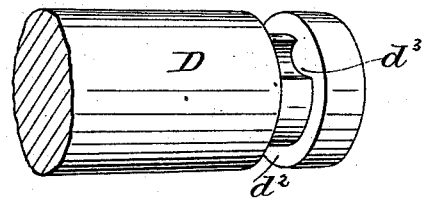

Figure 1 is a longitudinal section through the hub and a portion of the axle. Fig. 2 is a transverse section through the groove in the end of the axle, with the hinged washer closed thereon. Fig. 3 is a transverse section of the same with the hinged washer open. Fig. 4 is a perspective view of one end of the axle, showing the longitudinal groove or recess within the circular groove made to receive the hinged washer.

In said drawings, A represents the cast-metal hub. It is made nearly cylindrical, and upon its periphery there are formed, integral therewith, two rings, A', having a convex and rounded surface, and into each ring are screwed a series of diverging metal rods, B, forming the spokes of the wheel. The central portion of the hub is provided with an annular chamber, $b$, to receive lubricating-oil, that may be introduced therein through the hole closed by the screw-cap $b'$. One end of the hub has an annular recess, $c$, to receive the collar $d$ of the axle D, while the outer end of the hub is screw-threaded at $e$ to retain the screw-cap F, that incloses the end of the axle.

To retain the wheel or its hub securely upon the axle there is formed in the latter, adjoining its extremity, a circular groove, $d^2$, of suitable size to hold a metal washer, G, formed of two segments, G' and $G^2$, hinged together at the end $g$ by a pin, $g'$. The hinge $g$ is purposely made wider than the other portion of the segments of the washer, so that although of uniform diameter externally it will project inwardly or toward the center of the washer; and to receive this projecting part $g$ of the hinge a longitudinal groove or recess, $d^3$, is formed in the bottom of the circular groove $d^2$ of the axle. When the washer G is closed in position within the groove of the axle, as shown in Fig. 2, and the screw-cap is secured over it, it remains immovable upon the axle and protects the sides of the groove $d^2$ against wear, while the wear upon the washer can be easily remedied by screwing up the cap F tighter upon the end of the hub.

Having now fully described my invention, I claim—

The combination of the hub of a wheel and its screw-cap F with an axle provided with a circular groove, $d^2$, and a longitudinal groove, $d^3$, within the bottom of the groove $d^2$, and a washer formed of hinged segments, the hinge thereof projecting inwardly and resting within the groove $d^3$ of the axle, substantially as and for the purpose described.

ABRAM W. STEVENS.

Witnesses:
 THOMAS D. BOAK,
 CHARLES E. STEVENS.